United States Patent [19]

Kathan

[11] Patent Number: 5,419,053
[45] Date of Patent: May 30, 1995

[54] MEASURING TOOL

[76] Inventor: Larry Kathan, #202D, 13124 - 126 Street, Edmonton, Alberta, Canada, T5L 0Y7

[21] Appl. No.: 206,719

[22] Filed: Mar. 7, 1994

[30] Foreign Application Priority Data

Apr. 26, 1993 [CA] Canada ................ 2095048

[51] Int. Cl.⁶ ................................ B43L 7/10
[52] U.S. Cl. ......................... 33/417; 33/424
[58] Field of Search ............... 33/415, 416, 417, 418, 33/424, 426, 495, 496, 497, 498, 499, 500

[56] References Cited

U.S. PATENT DOCUMENTS

| | | |
|---|---|---|
| 168,563 | 2/1912 | Henderson . |
| 185,356 | 2/1914 | Brown . |
| 186,119 | 3/1914 | Barker . |
| 217,339 | 4/1918 | Johns . |
| 475,390 | 5/1918 | Downey ................ 33/500 |
| 876,042 | 1/1928 | Darr ..................... 33/497 |
| 1,568,115 | 1/1926 | Weaver ................ 33/417 |
| 1,797,213 | 3/1931 | Marcum ................ 33/499 |
| 1,983,516 | 12/1934 | Ahola ................... 33/426 |
| 2,054,420 | 9/1936 | Hochman ............. 33/495 |
| 2,064,430 | 12/1936 | Johnson . |
| 2,353,989 | 7/1944 | Beaucage . |
| 2,735,185 | 2/1956 | Naphtal . |
| 2,775,037 | 12/1956 | Baumunk . |
| 2,990,620 | 7/1961 | Tagliere . |
| 3,238,625 | 3/1966 | Myers . |
| 5,205,045 | 4/1993 | Liu ...................... 33/426 |

FOREIGN PATENT DOCUMENTS

| | | |
|---|---|---|
| 456552 | 2/1949 | Canada . |
| 1058858 | 7/1979 | Canada ................ 33/82 |
| 22174 | 3/1907 | Sweden ................ 33/424 |

Primary Examiner—William A. Cuchlinski, Jr.
Assistant Examiner—G. Bradley Bennett
Attorney, Agent, or Firm—Anthony R. Lambert

[57] ABSTRACT

A measuring tool includes a primary body having an elongate rectangular primary ruler with a primary protractor at one end describing a segment of a circle. A secondary body is provided having a pair of parallel spaced members. Each of the parallel spaced members has an elongate rectangular secondary ruler with a secondary protractor at one end describing a segment of a circle. The secondary body is pivotally connected to the primary body such that the primary body is positioned between the parallel spaced members of the secondary body with the secondary rulers overlying the primary ruler and the secondary protractors overlying the primary protractor. The measuring tool, as described, combines in a single tool functions which would normally require multiple tools.

13 Claims, 5 Drawing Sheets 5,419,053

MEASURING TOOL

BACKGROUND OF THE INVENTION

There are a variety of tools suitable for use by tradesmen in measuring and marking materials during construction and fabrication. The number of measuring tools a tradesman can conveniently carry is, however, extremely limited. Efforts have therefore been made in the past to create a single tool which can perform multiple functions, thereby reducing the number of tools the tradesman must carry.

SUMMARY OF THE INVENTION

What is required is a multi-function measuring tool.

According to the present invention there is provided a measuring tool which includes a primary body having an elongate rectangular primary ruler with a primary protractor at one end describing a segment of a circle. The primary body has a first side, a second side, a first longitudinal edge, a second longitudinal edge, an outwardly projecting edge extending from the second longitudinal edge and an arcuate edge that describes an arc extending from the projecting edge to the first longitudinal edge. The primary ruler has numeric scales on the first side and the second side. The primary protractor has numeric scales on the first side and the second side. A secondary body is provided having a pair of parallel spaced members. Each of the parallel spaced members has an elongate rectangular secondary ruler with a secondary protractor at one end describing a segment of a circle. The secondary body has a first side, a second side, a pair of first longitudinal edges, a pair of second longitudinal edges, a pair of outwardly projecting edges extending from the second longitudinal edges and a pair of arcuate edges that describe arcs extending from the projecting edges to the first longitudinal edges. The secondary rulers have numeric scales on the first side and the second side. The secondary protractors have numeric scales on the first side and the second side. The secondary body is pivotally connected to the primary body such that the primary body is positioned between parallel spaced members of the secondary body with the secondary rulers overlying the primary ruler and the secondary protractors overlying the primary protractor. The secondary protractors are smaller than the primary protractor such that the numeric scales on the primary protractor are visible when the secondary protractors overlie the primary protractor.

Having secondary rulers overlying a primary ruler and secondary protractors overlying a primary protractor has an effect of substantially expanding potential function of the measuring tool described while maintaining a compact readily transportable form. There are four linear numeric scales that can be used on the first and second sides of the primary ruler and on each of the secondary rulers. There are also four angular numeric scales that can be used on the first and second sides of the primary protractor and on the each of the secondary protractors. In addition, the scales on the primary body and the secondary body can be related to each other.

The measuring tool, as described, can readily be adapted for use as a measuring tool or layout tool in a variety of industries. One example of such an industry is the roofing industry. When constructing a sloped roof a support structure consisting of a plurality of rafters must be put in place. There are four distinct types of rafters: common rafters, hip rafters, valley rafters and jack rafters. Common rafters extend from a plate along a top of an outside wall to a horizontal member along the peak of the roof known as a "ridge board". Hip rafters extend diagonally from an outside corner of intersecting plates to the ridge board. Valley rafters extend diagonally from an inside corner of intersecting plates to a ridge of one of a pair of intersection roofs. Jack rafters extend from the plate to a hip rafter or a valley rafter. The angular positioning and cutting of the rafters is determined by calculations based primarily upon the relationship between "rise" and "run". The rise of a roof is the vertical distance from the plate to a point on the ridge board where an intersection of common rafters occur. The run of a roof is the horizontal distance from the centre of the ridge board to the outside of the plate. The roofing industry can be used as an example of the versatility of a measuring tool constructed in accordance with the teachings of the present invention.

When adapted for use in the roofing industry the numeric scale on at least one of the first side and the second side of the primary protractor reflects values for rise and having a pointer member directed at the secondary protractor. The numeric scale on the secondary protractors reflects degrees. When the primary body and the secondary body are angularly adjusted the projecting edge of the secondary body designates a numeric value for rise on the numeric scale of the primary protractor and the pointer member of the primary protractor points to a numeric value in degrees for the angular positioning on the numeric scale of the secondary protractor.

Although the measuring instrument with the capability of measuring rise is useful, it can be even more useful if it also has the capability of reflecting values for run. Even more beneficial results may, therefore, be obtained when the numeric scale on at least one of the first side and the second side of the primary protractor reflects values for run and having a pointer member directed at the secondary protractor. The numeric scale on the secondary protractors reflects degrees. When the primary body and the secondary body are angularly adjusted the projecting edge of the secondary body designates a numeric value for run on the numeric scale of the primary protractor and the pointer member of the primary protractor points to a numeric value in degrees for the angular positioning on the numeric scale of the secondary protractor.

Although the measuring tool, as described, is useful there are differences in measurement of common rafters as compared to hip rafters and valley rafters. Even more beneficial results may, therefore, be obtained when the first side of the secondary protractors reflect values in degrees from 0 to 90 degrees and the numeric scale on the second side of the secondary protractors reflect values in degrees in excess of 100 degrees.

Although beneficial results may be obtained through the use of the measuring tool, as described, a conversion must be made of all measurements depending upon "unit rise". Unit rise is the vertical distance a roof rises for each foot of run. Even more beneficial results may be obtained by having a table containing conversion factors for converting measurements to corresponding values for Hip rafters and Valley rafters, Jacks rafters, and common rafters in view of unit rise as one of the numeric scales on one of the primary ruler and the secondary rulers.

Although beneficial results may be obtained through the use of the measuring tool, as described, it is preferable that a lock be provided to secure the primary body and the secondary body in a selected relative pivotal position. It is preferable that this enable adjustments to be made rapidly and accurately. Even more beneficial results may, therefore, be obtained when the primary protractor has an arcuate slot. A screw clamp having two mating portions extends through the arcuate slot from the secondary protractors. Upon relative rotation of the mating portions of the screw clamp in a first direction the screw clamp clamps the primary body and the secondary body together and upon relative rotation of the mating portions of the screw clamp in a second direction the clamping action of the screw clamp is released. A lever is secured to one of the mating portions of the screw clamp whereby the screw clamp is rapidly tightened and released. The preferred positioning for the lever in the tightened position is parallel to the secondary body.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
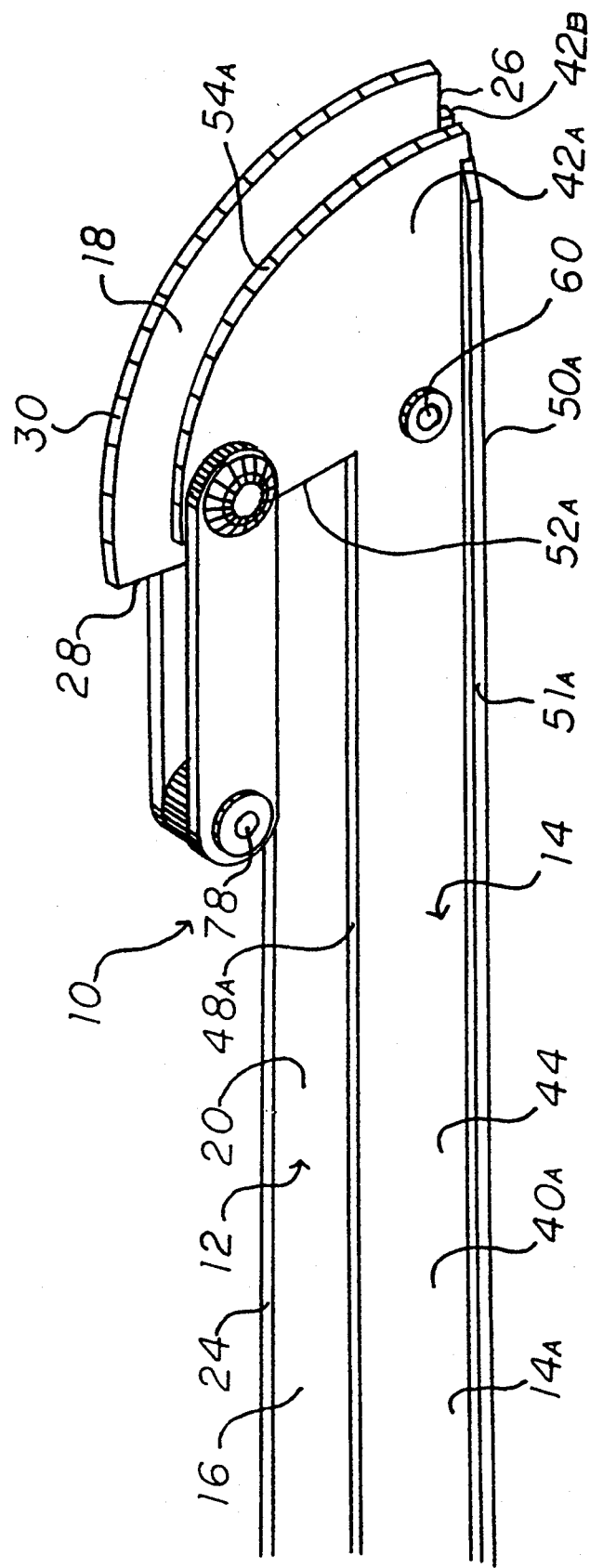
FIG. 1 is a perspective view of a measuring tool constructed in accordance with the teachings of the present invention in a stored position.

The preferred embodiment, a measuring tool generally identified by reference numeral 10, will now be described with reference to FIGS. 1 through 5.

Figure 2:
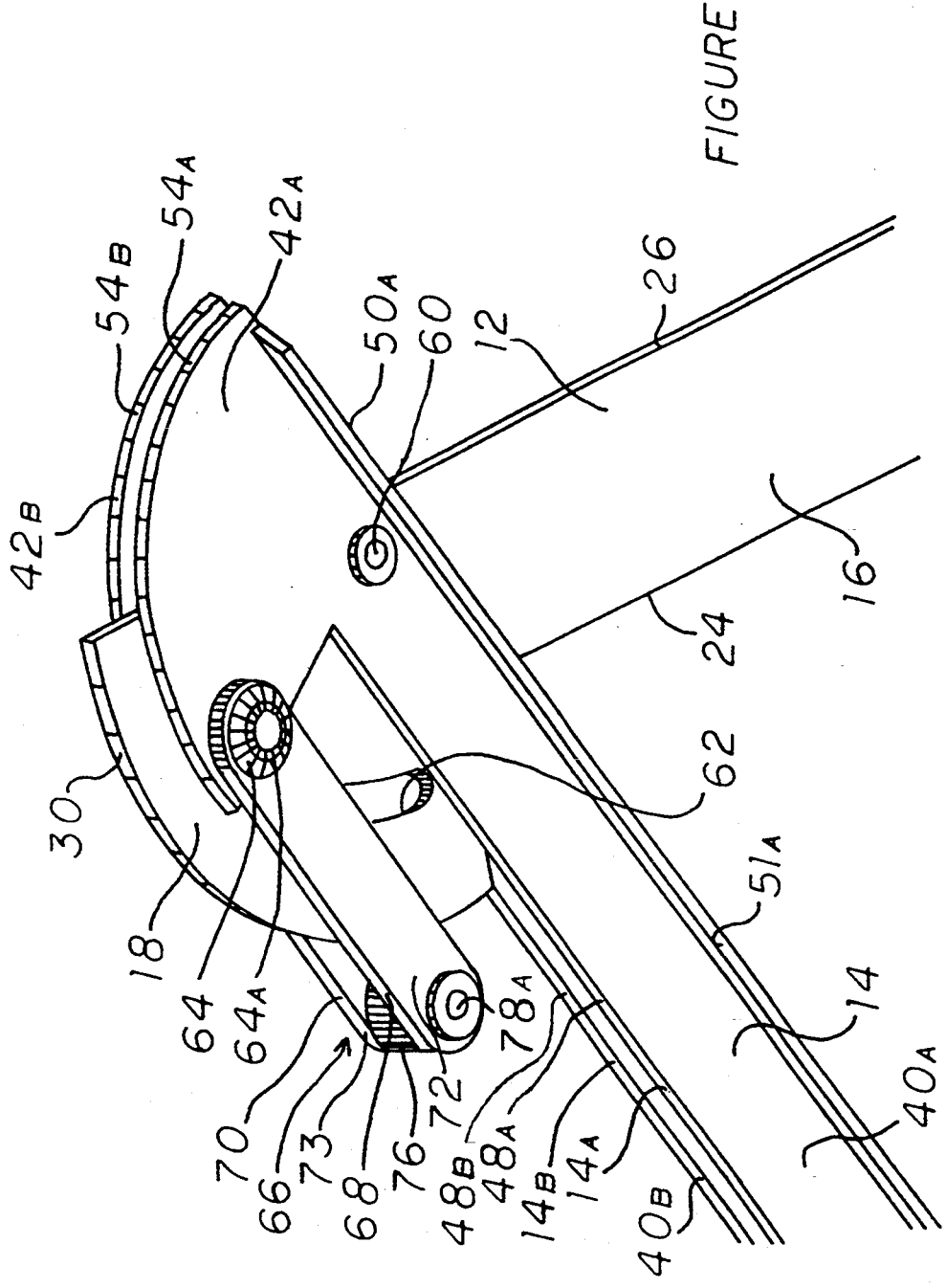
FIG. 2 is a perspective view of the measuring tool illustrated in FIG. 1 in an operative position.
Figure 3:
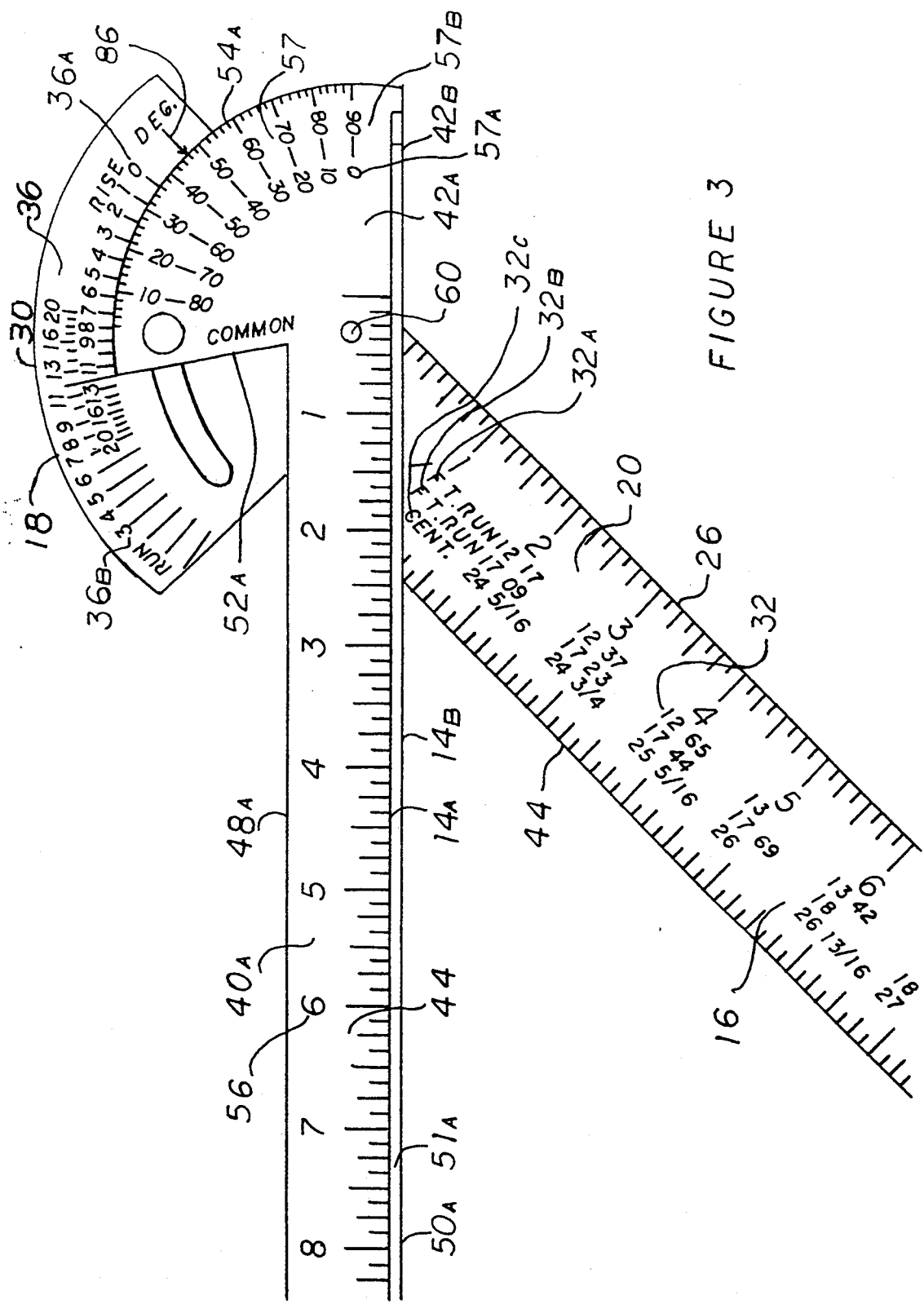
FIG. 3 is a side elevation view of a first side of the measuring tool illustrated in FIG. 1.
Figure 4:
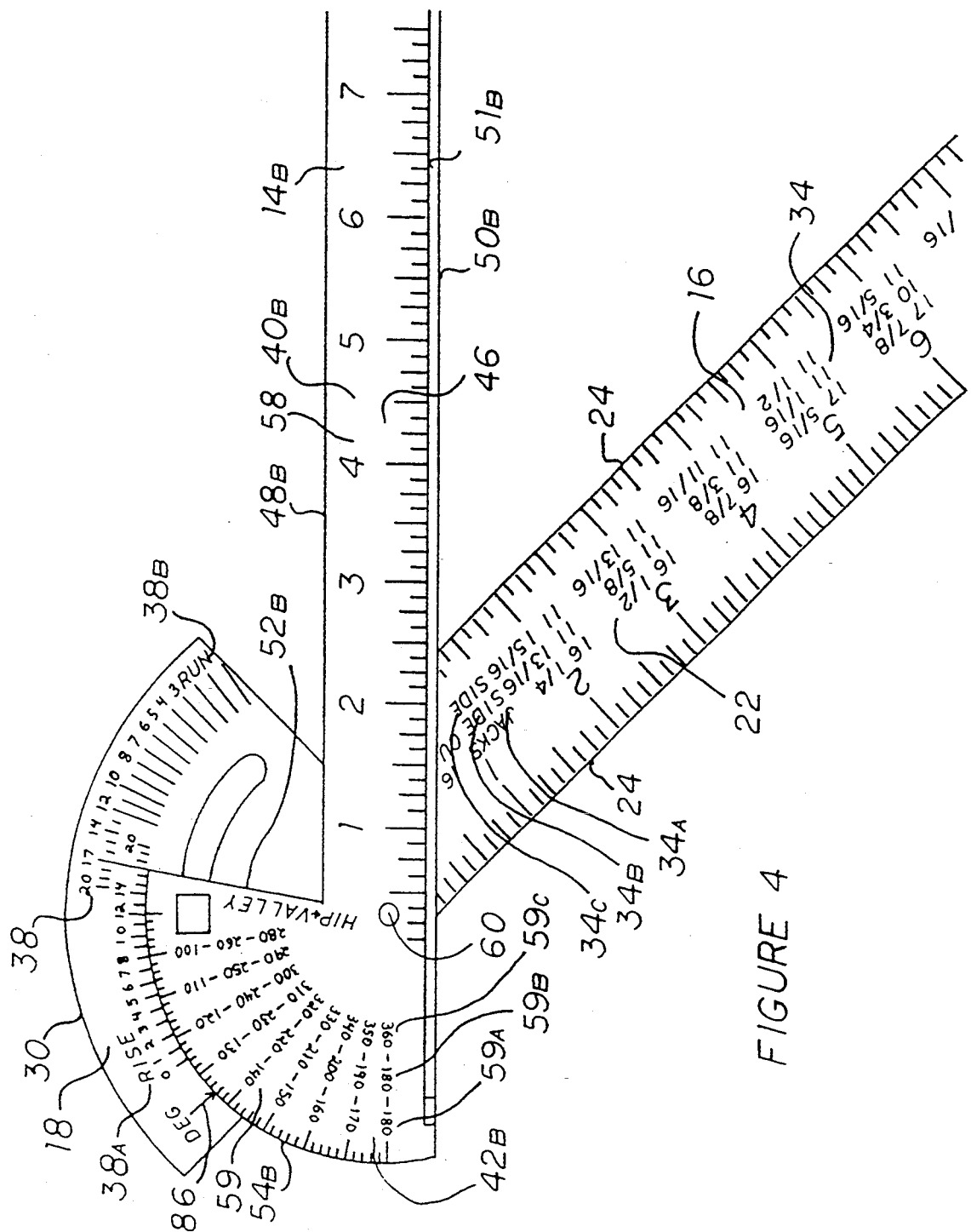
FIG. 4 is a side elevation view of a second side of the measuring tool illustrated in FIG. 1.
Figure 5:
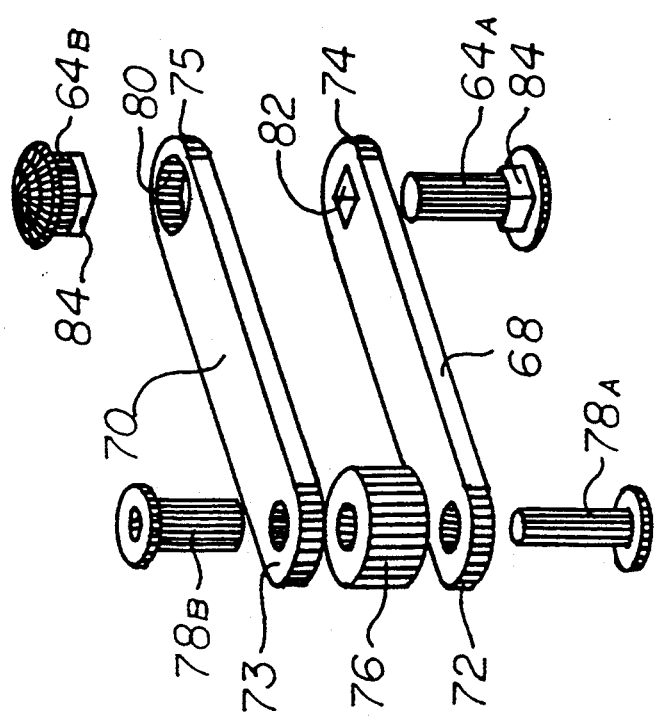
FIG. 5 is an exploded detail view of a locking mechanism from the measuring tool illustrated in FIG. 1.

Measuring tool 10 includes a primary body 12 and a secondary body 14. Primary body 12 has an elongate rectangular primary ruler 16 which is 16 inches in length with a primary protractor 18 at one end. Primary protractor 18 describes a segment of a circle. In the illustrated embodiment, primary body 12 has a first side 20, a second side 22, a first longitudinal edge 26, a second longitudinal edge 24, an outwardly projecting edge 28 extending from second longitudinal edge 24 and an arcuate edge 30. Arcuate edge 30 describes an arc extending from projecting edge 28 to first longitudinal edge 26. Referring to FIGS. 3 and 4, primary ruler 16 has numeric scales 32 and 34, on first side 20 and second side 22, respectively. Primary protractor 18 has numeric scales 36 and 38 on first side 20 and second side 22, respectively. Secondary body 14 consists a pair of parallel spaced members 14a and 14b, best illustrated in FIG. 2. The components of secondary body 14 will hereinafter be designated as "a" or "b" depending upon whether they are to be found on parallel spaced member 14a or 14b. Each of parallel spaced members 14a and 14b has an elongate rectangular secondary ruler 40a and 40b, which is 17½ inches in length and has a secondary protractor 42a and 42b at one end. Secondary protractors 42a and 42b describe a segment of a circle. Secondary body 14 has a first side 44 represented by parallel spaced member 14a and a second side 46 represented by parallel spaced member 14b. The edges of secondary body 14 include; a pair of second longitudinal edges 48a and 48b, a pair of first longitudinal edges 50a and 50b, a pair of outwardly projecting edges 52a and 52b extending from second longitudinal edges 48a and 48b and a pair of arcuate edges 54a and 54b. Arcuate edges 54a and 54b describe arcs extending from projecting edges 52a and 52b, respectively, to first longitudinal edges 50a and 50b. First longitudinal edges 50a and 50b have projecting flanges 51a and 51b. Flanges 51a and 51b serve two primary roles. They serve to add rigidity to secondary body 14. They provide a lip to maintain secondary ruler 40a and 40b in position when measuring a board that is partially rounded. Referring to FIGS. 3 and 4, secondary rulers 40a and 40b have numeric scales 56 and 58 on first side 44 and second side 46, respectively. Secondary protractors 42a and 42b have numeric scales 57 and 59 on first side 44 and second side 46, respectively. Secondary body 14 is pivotally connected to primary body 12 at pivot point 60. Through relative movement of primary body 12 and secondary body 14 measuring tool 10 can be moved from a stored position as illustrated in FIG. 1 to an operative position as illustrated in FIG. 2. Referring to FIG. 1, it will be noted that primary body 12 is positioned between parallel spaced members 14a and 14b of secondary body 14 with secondary rulers 40a and 40b overlying primary ruler 16 and secondary protractors 42a and 42b overlying primary protractor 18. Secondary protractors 42a and 42b are smaller than primary protractor 18 such that numeric scales 36 and 38 on primary protractor 18 are visible when secondary protractors 42a and 42b overlie primary protractor 18. The means for locking primary body 12 in relation to secondary body 14 is illustrated in FIGS. 1, 2, and 5. Primary protractor 18 has an arcuate slot 62. A screw clamp, generally designated by reference numeral 64 is provided having two mating portions 64a and 64b. Screw clamp portion 64a is secured to arm 68 and screw clamp portion 64b is secured to secondary protractor 42a. Screw clamp 64 extends through secondary protractors 42a and 42b and through arcuate slot 62 in primary protractor 18. Upon relative rotation of mating portions 64a and 64b of screw clamp 64 in a first direction screw clamp 64 clamps primary body 12 and secondary body 14 together. Upon relative rotation of mating portions 64a and 64b of screw clamp 64 in a second direction the clamping action of screw clamp 64 is released. A lever, generally designated by reference numeral 66, is secured to mating portions 64a of screw clamp 64. Lever 66 serves as a "quick handle" to permit screw clamp 64 to be rapidly tightened and released. The preferred positioning for the lever in the tightened position is parallel to the secondary body, so it is out of the way and does not interfere with measurement or present a problem when handling. Referring to FIG. 5, lever 66 has two arms 68 and 70. Each of arms 68 and 70 have a first end 72 and 73 respectively and a second end 74 and 75, respectively. First ends 72 and 73 of arms 68 and 70 are fastened to a spacer element 76 by a two component fastener 78 having a first component 78a and a second component 78b. Second end 75 of arm 70 has a circular opening 80 which slides over mating portion 64b of screw clamp 64. Second end 74 of arm 68 has a square opening 82 which engages a square portion 84 on mating portion 64a of screw clamp 64. In view of the engagement between square portion 84 of mating portion 64a and square opening 82 of arm 68, when lever 66 is moved mating portion 64a turns resulting in a tightening or a releasing of screw clamp 64 depending upon the direction of rotation.

Referring to FIG. 3, the particular numeric scales used on the illustrated embodiment will now be described. FIG. 3 illustrates first side 20 of primary ruler 16 which has numeric scale 32, first side 20 of primary protractor 18 which has numeric scale 36, first side 44 of secondary ruler 40a which has numeric scale 56 and first side 44 of secondary protractor 42a which has numeric scale 57. Numeric scale 36 on primary protractor 18 is divided into a first portion 36a and a second portion 36b. First portion 36a reflects values for rise; portion 36b reflects values for run. Included as part of numeric scale 36 is a pointer member 86 directed at secondary protractor 42a. Numeric scale 57 on secondary protractor 42a reflects degrees. Primary body 12 and secondary body 14 are angularly adjustable by pivotal movement around pivot point 60 to align projecting edge 52a of secondary body 14 to designate a numeric value for rise on first portion 36a of numeric scale 36 of primary protractor 12 or to align projecting edge 52a of secondary body 14 to designate a numeric value for run on second portion 36b. When measuring rise, first longitudinal edge 26 of primary ruler 16 is held in substantially vertical position against the exterior wall and second ruler 40a is pivoted to follow the angle of rise of the common rafter. The measuring line used on the common rafter is generally along the side of the common rafter parallel to a top edge. When this is done projecting edge 52a designates the numeric value of rise, while pointer member 86 points to a numeric value in degrees for angular positioning of common rafters on numeric scale 57 of secondary protractor 42a. It should be noted that scale 57 has an inner portion 57a and an outer portion 57b. Inner scale 57a reflects the angular relationship in degrees between second longitudinal edge 24 of primary ruler 16 and first longitudinal edge 50a of secondary ruler 40a. Outer scale 57b reflects the angular relationship in degrees between outwardly projecting edge 28 of primary body 12 and first longitudinal edge 50a of secondary body 14. When measuring run, first longitudinal edge 26 of primary ruler 16 is held in a substantially horizontal position on the plate and second ruler 40a is pivoted to follow the angle of rise of the common rafter. Numeric scale 56 on secondary ruler 40a is ruled to permit linear measurement of length in either imperial units (inches) or metric units (centimeters). Numeric scale 32 on primary ruler 16 is also ruled to permit linear measurement, in addition however numeric scale 32 includes a table containing conversion factors for converting measurements of length to corresponding values for common rafters 32a, Hip and Valley rafters 32b, or Jack rafters on 24 inch centers 32c. The table is read as follows: if the measured run is 10 feet and the unit rise is measured as 9/12, then the conversion factor for the applicable common rafter length is found by looking at the values given on numeric scale 32a under the number 9. The conversion factor listed on numeric scale 32a is 15.00, therefore the length of the common rafter is 15.00×10=150 inches or 12 feet six inches.

Referring to FIG. 4, the particular numeric scales used on the illustrated embodiment will now be described. FIG. 4 illustrates second side 22 of primary ruler 16 which has numeric scale 34, second side 22 of primary protractor 18 which has numeric scale 38, second side 46 of secondary ruler 40b which has numeric scale 58 and second side 46 of secondary protractor 42b which has numeric scale 59. Numeric scale 38 on primary protractor 18 is divided into a first portion 38a and a second portion 38b. First portion 38a reflects values for rise; second portion 38b reflects values for run. Included as part of numeric scale 38 is a pointer member 86 directed at secondary protractor 42b. Numeric scale 59 on secondary protractor 42b reflects degrees. Primary body 12 and secondary body 14 are angularly adjustable by pivotal movement around pivot point 60 to align projecting edge 52b of secondary body 14 to designate a numeric value for rise on first portion 38a of numeric scale 38 of primary protractor 12 or to align projecting edge 52b of secondary body 14 to designate a numeric value for run on second portion 38b. When measuring rise, second longitudinal edge 24 of primary ruler 16 is held in a substantially horizontal position against the plate and second ruler 40b is pivoted to follow the angle of rise of the hip rafter or the valley rafter. The scale 59 of secondary protractor 42b also reflects degrees. It should be noted that scale 59 has three rows of figures; a first row 59a, a second row 59b and a third row 59c. Scale 59 continues the degrees reflected in scales 57a and 57b, which range from 0 degrees to 90 degrees. First row 59a reflects 100 degrees to 180 degrees. Second row 59b reflects 180 degrees to 270 degrees. Third row 59c reflects 270 degrees to 360 degrees. In this manner by positioning secondary protector 42a and 42b in a variety of rotational positions it is possible to move through a range of degrees from 0 degrees to 360 degrees. Numeric scale 58 on secondary ruler 40b is ruled to permit linear measurement of length in either imperial units (inches) or metric units (centimeters). Numeric scale 34 on primary ruler 16 is also ruled to permit linear measurement, in addition however numeric scale 34 includes a table containing conversion factors for converting measurements of length to corresponding values for jacks rafters on 16 inch centers 34a, side cut jack rafters 34b, or side cut hip and valley rafters 34c.

It will be apparent to one skilled in the art that modifications may be made to the illustrated embodiment without departing from the spirit and scope of the invention as defined by the claims. In particular, it will be apparent that the present invention may be adapted for use by tradesmen in other than the roofing industry.

The embodiments of the invention in which an exclusive property or privilege is claimed are as follows:

1. A measuring tool, comprising:
   a. a primary body having an elongate rectangular primary ruler with a primary protractor at one end describing a segment of a circle, the primary body having a first side, a second side, a first longitudinal edge, a second longitudinal edge, an outwardly projecting edge extending from the second longitudinal edge and an arcuate edge that describes an arc extending from the projecting edge to the first longitudinal edge, the primary ruler having numeric scales on the first side and the second side, the primary protractor having numeric scales on the first side and the second side; and
   b. a secondary body having a pair of parallel spaced members each having an elongate rectangular secondary ruler with a secondary protractor at one end describing a segment of a circle, the secondary body having a first side, a second side, a pair of first longitudinal edges, a pair of second longitudinal edges, a pair of outwardly projecting edges extending from the second longitudinal edges and a pair of arcuate edges that describe arcs extending from the projecting edges to the first longitudinal edges, the secondary rulers having numeric scales on the first side and the second side, the secondary protractors having numeric scales on the first side and the second side, the secondary body being pivotally connected to the primary body such that the primary body is positioned between parallel spaced members of the secondary body with the secondary rulers overlying the primary ruler and the secondary protractors overlying the primary protractor, the secondary protractors being smaller than the primary protractor such that the numeric scales on the primary protractor are visible when the secondary protractors overlie the primary protractor.

2. The measuring tool as defined in claim 1, the secondary rulers having a flange along the first longitudinal edge.

3. The measuring tool as defined in claim 1, having a lock to secure the primary body and the secondary body in a selected relative pivotal position.

4. The measuring tool as defined in claim 1, the numeric scale on at least one of the first side and the second side of the primary protractor reflecting values for rise and having a pointer member directed at the secondary protractor, the numeric scale on the secondary protractors reflecting degrees such that when the primary body and the secondary body are angularly adjusted the projecting edge of the secondary body designates a numeric value for rise on the numeric scale of the primary protractor and the pointer member of the primary protractor points to a numeric value in degrees for the angular positioning on the numeric scale of the secondary protractor.

5. The measuring tool as defined in claim 1, the numeric scale on at least one of the first side and the second side of the primary protractor reflecting values for run, and having a pointer member directed at the secondary protractor, the numeric scale on the secondary protractors reflecting degrees such that when the primary body and the secondary body are angularly adjusted the projecting edge of the secondary body designates a numeric value for run on the numeric scale of the primary protractor and the pointer member of the primary protractor points to a numeric value in degrees for the angular positioning on the numeric scale of the secondary protractor.

6. The measuring tool as defined in claim 3 and 4, the numeric scale on the first side of the secondary protractors reflecting values in degrees from 0 degrees to 90 degrees and the numeric scale on the second side of the secondary protractors reflecting values in degrees in excess of 100 degrees.

7. The measuring tool as defined in claim 1, having a table containing conversion factors for converting measurements to corresponding values for Hip rafters and Valley rafters, jacks rafters, and common rafters in view of unit rise as one of the numeric scales on one of the primary ruler and the secondary rulers.

8. The measuring tool as defined in claim 2, the primary protractor having an arcuate slot, a screw clamp having two mating portions extending through the arcuate slot from the secondary protractors, such that upon relative rotation of the mating portions of the screw clamp in a first direction the screw clamp clamps the primary protractor between the secondary protractors and upon relative rotation of the mating portions of the screw clamp in a second direction the clamping action of the screw clamp is released, a lever being secured to one of the mating portions of the screw clamp whereby the screw clamp is rapidly tightened and released.

9. A measuring tool, comprising:
a. a primary body having an elongate rectangular primary ruler with a primary protractor at one end describing a segment of a circle, the primary body having a first side, a second side, a first longitudinal edge, a second longitudinal edge, an outwardly projecting edge extending from the second longitudinal edge and an arcuate edge that describes an arc extending from the projecting edge to the first longitudinal edge, the primary ruler having numeric scales on the first side and the second side, the primary protractor having numeric scales on the first side and the second side;
b. a secondary body having a pair of parallel spaced members each having an elongate rectangular secondary ruler with a secondary protractor at one end describing a segment of a circle, the secondary body having a first side, a second side, a pair of first longitudinal edges, a pair of second longitudinal edges, a pair of outwardly projecting edges extending from the second longitudinal edges and a pair of arcuate edges that describe arcs extending from the projecting edges to the first longitudinal edges, the secondary rulers having numeric scales on the first side and the second side, the secondary protractors having numeric scales on the first side and the second side, the secondary body being pivotally connected to the primary body such that the primary body is positioned between parallel spaced members of the secondary body with the secondary rulers overlying the primary ruler and the secondary protractors overlying the primary protractor, the secondary protractors being smaller than the primary protractor such that the numeric scales on the primary protractor are visible when the secondary protractors overlie the primary protractor; and
c. the primary protractor having an arcuate slot, a screw clamp having two mating portions extending through the arcuate slot from the secondary protractors, such that upon relative rotation of the mating portions of the screw clamp in a first direction the screw clamp clamps the primary protractor between the secondary protractors thereby securing the primary body and the secondary body in a selected relative pivotal position, and upon relative rotation of the mating portions of the screw clamp in a second direction the clamping action of the screw clamp is released, a lever being secured to one of the mating portions of the screw clamp whereby the screw clamp is rapidly tightened and released.

10. The measuring tool as defined in claim 8, the numeric scale on the first side of the primary protractor having a first portion reflecting values for rise and a second portion reflecting values for run, the primary protractor having a pointer member directed at the secondary protractor, the numeric scale on the secondary protractors reflecting degrees such that the primary body and the secondary body are angularly adjustable to align the projecting edge of the secondary body to designate a numeric value for rise on the first portion of the numeric scale of the primary protractor and run on the second portion of the numeric scale of the primary protractor and the pointer member of the primary protractor points to a numeric value in degrees for angular positioning of common rafters on the numeric scale of the secondary protractor.

11. The measuring tool as defined in claim 8, the numeric scale on the second side of the primary protractor having a first portion reflecting values for rise and a second portion reflecting values for run, the primary protractor having a pointer member directed at the secondary protractor, the numeric scale on the secondary protractors reflecting degrees such that the primary body and the secondary body are angularly adjustable to align the projecting edge of the secondary body to designates a numeric value for rise on the first portion of the numeric scale of the primary protractor and a numeric value for run on the second portion of the numeric scale of the primary protractor and the pointer member of the primary protractor points to a numeric value in degrees on the numeric scale of the secondary protractor.

12. The measuring tool as defined in claim 8, having a table containing conversion factors for converting measurements to corresponding values for Hip rafters and Valley rafters, jacks rafters, and common rafters in view of unit rise as one of the numeric scales on one of the primary ruler and the secondary rulers.

13. A measuring tool, comprising:
   a. a primary body having an elongate rectangular primary ruler with a primary protractor at one end describing a segment of a circle, the primary body having a first side, a second side, a first longitudinal edge, a second longitudinal edge, an outwardly projecting edge extending from the second longitudinal edge and an arcuate edge that describes an arc extending from the projecting edge to the first longitudinal edge, the primary ruler having numeric scales on the first side and the second side, the primary protractor having numeric scales on the first side and the second side;
   b. a secondary body having a pair of parallel spaced members each having an elongate rectangular secondary ruler with a secondary protractor at one end describing a segment of a circle, the secondary body having a first side, a second side, a pair of first longitudinal edges, a pair of second longitudinal edges, a pair of outwardly projecting edges extending from the second longitudinal edges and a pair of arcuate edges that describe arcs extending from the projecting edges to the first longitudinal edges, the secondary rulers having numeric scales on the first side and the second side, the secondary protractors having numeric scales on the first side and the second side, the secondary body being pivotally connected to the primary body such that the primary body is positioned between parallel spaced members of the secondary body with the secondary rulers overlying the primary ruler and the secondary protractors overlying the primary protractor, the secondary protractors being smaller than the primary protractor such that the numeric scales on the primary protractor are visible when the secondary protractors overlie the primary protractor, the secondary rulers having a flange along the first longitudinal edge;
   c. the primary protractor having an arcuate slot, a screw clamp having two mating portions extending through the arcuate slot from the secondary protractors, such that upon relative rotation of the mating portions of the screw clamp in a first direction the screw clamp clamps the primary protractor between the secondary protractors thereby securing the primary body and the secondary body in a selected relative pivotal position, and upon relative rotation of the mating portions of the screw clamp in a second direction the clamping action of the screw clamp is released, a lever being secured to one of the mating portions of the screw clamp whereby the screw clamp is rapidly tightened and released;
   d. the numeric scale on the first side of the primary protractor having a first portion reflecting values for rise and a second portion reflecting values for run, the primary protractor having a pointer member directed at the secondary protractor, the numeric scale on the secondary protractors reflecting degrees such that the primary body and the secondary body are angularly adjustable to align the projecting edge of the secondary body to designate a numeric value for rise on the first portion of the numeric scale of the primary protractor and run on the second portion of the numeric scale of the primary protractor and the pointer member of the primary protractor points to a numeric value in degrees for angular positioning of common rafters on the numeric scale of the secondary protractor;
   e. the numeric scale on the second side of the primary protractor having a first portion reflecting values for rise and a second portion reflecting values for run, the primary protractor having a pointer member directed at the secondary protractor, the numeric scale on the secondary protractors reflecting degrees such that the primary body and the secondary body are angularly adjustable to align the projecting edge of the secondary body to designates a numeric value for rise on the first portion of the numeric scale of the primary protractor and a numeric value for run on the second portion of the numeric scale of the primary protractor and the pointer member of the primary protractor points to a numeric value in degrees on the numeric scale of the secondary protractor; and
   f. the numeric scale on the primary ruler including a table containing conversion factors for converting measurements to corresponding values for Hip rafters and Valley rafters, jacks rafters, and common rafters in view of unit rise.

* * * * *